Nov. 17, 1964 T. H. LEACH 3,157,106
STORAGE BIN
Filed Aug. 10, 1962 2 Sheets-Sheet 1

INVENTOR.
Thurman H. Leach
BY
Jennings, Carter & Thompson
Attorneys

Nov. 17, 1964    T. H. LEACH    3,157,106
STORAGE BIN
Filed Aug. 10, 1962    2 Sheets-Sheet 2

INVENTOR.
Thurman H. Leach
BY
Jennings, Carter & Thompson
Attorneys

United States Patent Office 3,157,106
Patented Nov. 17, 1964

3,157,106
STORAGE BIN
Thurman H. Leach, P.O. Box 1010, Gadsden, Ala.
Filed Aug. 10, 1962, Ser. No. 216,098
7 Claims. (Cl. 98—55)

This invention relates to a storage bin and more particularly to a bin for storing granular materials, such as animal feed.

An object of my invention is to provide a storage bin which shall have at least one upstanding partition wall therein defining separate storage compartments, together with improved means for adding strength to the upstanding partition wall to prevent sagging or damage to the partition wall as the bin is filled.

Another object of my invention is to provide a storage bin of the character designated which shall include a subjacent hopper, together with improved means for venting entrapped and compressed air from the bin and hopper caused by material bridging at some point in the compartment and subsequently breaking loose and falling as a mass, thus preventing deformation and damage to the hopper under the impact of this heavy mass of falling materials.

Another object of my invention is to provide a storage bin of the character designated which shall include improved means for venting the bin throughout the entire height thereof.

A more specific object of my invention is to provide a storage bin of the character designated in which the means for venting the storage bin also serves as stiffeners to prevent damage to the upstanding partition walls, the vent-stiffeners being mounted directly opposite each other with the partition wall therebetween.

A still further object of my invention is to provide a storage bin of the character designated which shall be simple of construction, economical of manufacture and one which is adapted for storing large masses of material in separate compartments which are mounted adjacent each other, thereby not only saving in the amount of space required, but also providing means for storing different types of feed at points closely adjacent each other.

Briefly, my improved storage bin comprises an outer housing having an upstanding partition wall therein which defines separate storage compartments. A discharge hopper is mounted adjacent the lower end of each storage compartment whereby feed may be removed selectively from the compartments. Upstanding channel-like members are mounted directly opposite each other with the partition wall therebetween whereby the bases or webs of the channel-like members are spaced from the partition wall to define vertically extending vent passageways for the removal gases from the storage bin and hopper when material bridges over and subsequently falls, entrapping and compressing air. Accordingly, if means is not provided for venting the compressed air from the storage compartment, the feed which has bridged over will break loose suddenly and then fall downwardly into the hopper whereby many tons of feed fall as a solid mass into the hopper. This not only deforms the hopper but often splits the hopper due to the sudden impact of the heavy mass of materials. The lower ends of the upstanding channel-like members are secured to each other with an upper portion of the hopper therebetween whereby added strength is given to the storage bin and at the same time means is provided for continuously venting any air which may be compressed within the storage bin or hopper.

A storage bin embodying features of my invention is illustrated in the accompanying drawings, forming a part of this application, in which.

Figures 1, 2, 3:
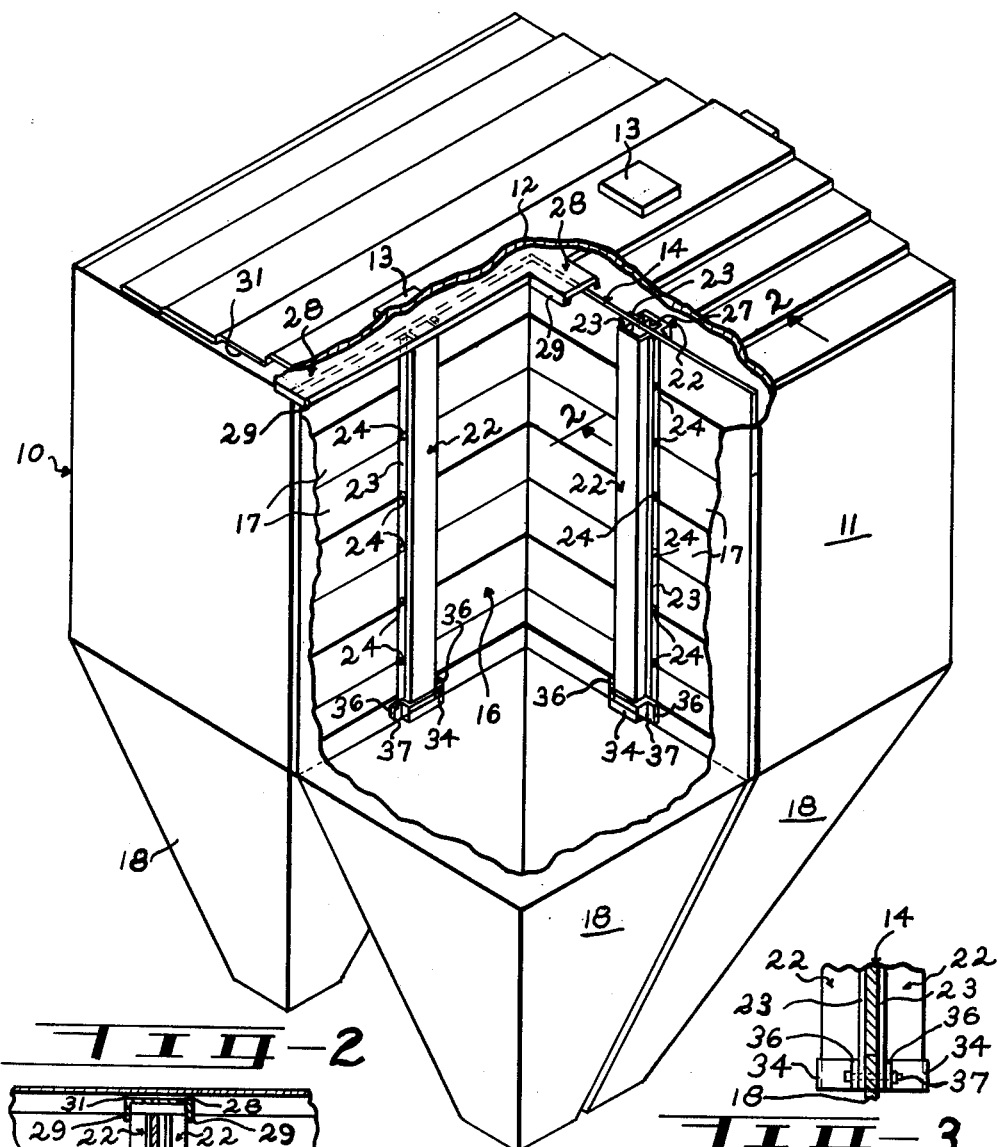
FIG. 1 is an isometric view partly broken away, showing a feed bin having four separate storage compartments.
FIG. 2 is an enlarged fragmental view taken generally along the line 2—2 of FIG. 1.
FIG. 3 is an enlarged fragmental view, partly in section, showing the lower ends of the upstanding channel-like members, together with the means for securing the channel-like members to each other with a portion of the hopper therebetween; and, FIG. 4 is a side elevational view showing the means for supporting the storage bin and the discharge means for the individual hoppers.

Referring now to the drawings for a better understanding of my invention, my storage bin comprises an outer housing 10 having vertical walls 11 and a top wall 12. That is to say, a top wall 12 is employed where the feed bin is employed as an outside installation. On the other hand, where the feed bin is erected for inside use, the top wall 12 may be eliminated. Where the top wall 12 is employed, removable closure members 13 are provided for entry to the storage compartments. In some cases the compartments may be filled through these closures. In other cases the compartments are filled through additional holes cut in top wall 12.

Mounted within the outer housing 10 are upstanding partition walls 14 and 16 which cross each other adjacent the center of the storage bin, as shown, to provide four separate compartments for storing granular materials, such as feed. While I have shown two upstanding partition walls 14 and 16, it will be apparent that a single upstanding partition wall may be employed or a plurality of such partition walls may be employed. Each partition wall is formed of a plurality of overlapped sheets of material 17, as shown in FIG. 2.

Figure 4:
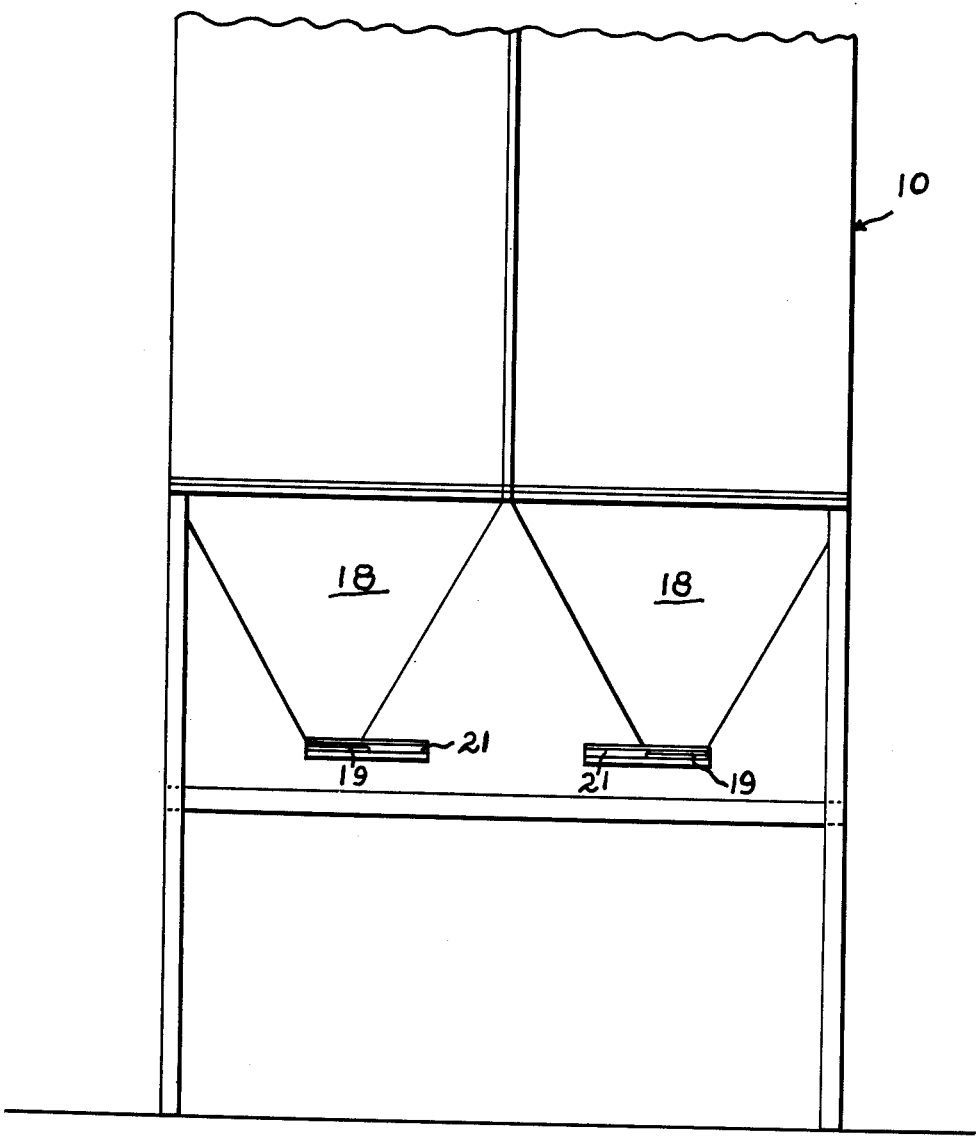

Mounted beneath each of the storage compartments defined by the upstanding partition walls 14 and 16 is a discharge hopper indicated generally at 18. The discharge end of the hopper 18 is closed by a movable valve member 19 which is adapted for sliding movement in suitable guideways 21, as shown in FIG. 4. While I have shown the valve member as being in the form of a gate valve, any suitable valve arrangement may be employed, such as a rotary valve, gate valve or the like.

Mounted adjacent opposite sides of the partition walls 14 and 16, as the case may be, are upstanding channel-like members 22. As shown in FIG. 2, the upstanding channel-like members are mounted adjacent the central portion of the upstanding partition walls 14 and 16 whereby this portion of the partition wall is stiffened and strengthened. The flanges of the channel-like members 22 extend inwardly toward the partition wall and the ends of the flanges adjacent the partition wall are turned outwardly as at 23 whereby they extend alongside and generally parallel to the partition wall confined between the upstanding channel-like members 22.

The overlapped sheets of material 17 are secured to the outturned members 23 of the upstanding channel-like members 22 by bolts at 24. As shown in FIG. 2, the overlapped arrangement of the sheets of material 17 provides a series of vent passageways 26 between the upstanding channel-like members 22 and the partition wall 14 or 16, as the case may be. Accordingly, air is free to pass from the storage compartment through the passageway 26 into the space between the base or web of the channel-like members 22 and the upstanding partition wall mounted therebetween. That is, the base or web of the channel-like member 22 is spaced from the upstanding wall 14 or 16, as the case may be, to provide generally vertically extending vent passageways 27 which are in direct communication with the vent passageways 26.

Mounted above the upstanding partition walls 14 and 16 and beneath the top wall 12 are transverse channel-like members 28 having flanges 29 which depend alongside the upstanding channel-like members 22, to distribute the load caused by the material on upstanding walls 14 and 16 which is transmitted through channel-like member 22 both to top of hopper and to the aforementioned channel-like members 28. The top of each channel-like member 22 is made to stop short of the web of transverse channel-like member 28 so that a passage is formed to permit air moving up channel-like member 22 to exhaust into space above upstanding walls 14 and 16 and top wall 12. Ventilators 31 are then provided in each end of the bin to allow passage of this air from the various compartments to the atmosphere outside the bin.

Fitting about the lower ends of the upstanding channel-like members 22 are U-shaped clamp members 34 having outturned flanges 36 which extend alongside and generally parallel to the upper portion of the hopper 18, as shown in FIGS. 1 and 3. That is, the U-shaped clamp members 34 are mounted directly opposite each other whereby the outturned flanges 36 are also opposite each other, as clearly shown in FIG. 3. Suitable openings are provided through the upper portion of the hopper 18 at opposite sides of the upstanding channel-like members 22 in register with suitable openings through the outturned flanges 36 for receiving securing bolts 37 which secure the channel-like members 22 to each other with the upper portion of the hopper 18 therebetween. Accordingly the lower portions of the upstanding channel-like member 22 are not only secured to each other but are secured firmly to the upper portion of the hopper 18.

From the foregoing description, the operation of my improved storage bin will be readily understood. The valve member 19 is moved to the closed position, as shown in FIG. 4, and the feed is introduced into selected ones of the storage compartments by removing the proper closure member 13 or by other suitable means, such as through pipes or through additional openings cut into the top wall 12. By mounting the closure members 13 directly over one of the partition walls, such as the wall 16, only two removable closure members are required for filling all four compartments and/or providing access thereto. As the feed falls downwardly into the storage compartment, the air entrapped beneath the feed is continuously vented by passing from the storage compartment through the vent openings 26 into the confines of the upstanding channel-like members 22, whereby the gases are vented through the vertical passageways 27 and thence to the space above the partition walls and under the top wall 12. The gases are then discharged through the ventilators 31 provided at each end of the bin. Since the air is allowed to escape from the hopper 18 and the storage compartment associated therewith when feed bridges and then falls as a mass, air cannot be trapped in the hopper thus preventing damage to the bin by compression of this air. The constant slight flexing of the partition walls in addition to the shifting of the feed in the bin and the hopper keeps any feed which might be thrown into the vent stiffener 22 loose, thereby preventing packing and filling of the vent stiffener 22.

From the foregoing, it will be seen that I have devised an improved storage bin for granular materials, such as animal feed and the like. By providing means for continuously venting the feed bin, and at the same time reinforcing the partition walls, the partition walls may be formed of relatively thin sheets of material. Also, by continuously venting the entrapped gases from the hopper and the storage bin, the feed is discharged into the hopper in a uniform manner, thereby completely eliminating damage to the hopper which heretofore has occurred when feed bridges over and then breaks loose and falls into the hopper as a heavy and substantially solid mass.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A storage bin for granular materials comprising:
   (a) an outer housing,
   (b) at least one upstanding wall within said outer housing defining separate storage compartments,
   (c) a hopper mounted adjacent the lower end of each of said separate storage compartments,
   (d) a first upstanding channel-like member having flanges extending inwardly into contact with one side of said wall intermediate the ends of said wall with the base of said first channel-like member spaced from said wall to define a vertical vent passageway,
   (e) a second upstanding channel-like member at the other side of said wall directly opposite said first channel-like member and having flanges extending inwardly into contact with said other side of the wall with the base of said second channel-like member spaced from said wall to define a vertical vent passageway,
   (f) means securing said first channel-like member to said second channel-like member adjacent the lower ends thereof,
   (g) and means securing said first and second channel-like members to said wall along the lengths of said channel-like members,
   (h) there being other vent passageways between said upstanding wall and said first and second channel-like members communicating said storage compartments with said vertical vent passageways for the passage of gases from said storage compartments to said vertical vent passageways.

2. A storage bin as defined in claim 1 in which the upstanding wall comprises a series of overlapped sheets of material secured to said channel-like members to define longitudinally spaced vent passageways between said wall and said channel-like members for the passage of gases from said storage compartments to said vertical vent passageways.

3. A storage bin as defined in claim 1 in which the inwardly extending flanges of said channel-like members are bent outwardly adjacent said wall in position to lie alongside said wall.

4. A storage bin as defined in claim 1 in which the means securing said first channel-like member to said second channel-like member comprises
   (a) pair of oppositely disposed, generally U-shaped clamp members fitting about said channel-like members with the legs of said clamp members extending inwardly toward each other,
   (b) outwardly extending flanges at the ends of said legs extending alongside the upper portion of said hopper,
   (c) there being openings through said hopper at opposite sides of said channel-like members and there being openings through said outwardly extending flanges in register with said openings through said hopper, (d) and securing means extending through said openings at opposite sides of said channel-like members.

5. A storage bin as defined in claim 1 in which an upper channel-like member having depending legs is mounted above said upstanding channel-like members with the base of said upper channel-like member spaced from the upper ends of said upstanding channel-like members.

6. A storage bin as defined in claim 1 in which said upstanding channel-like members are secured to said wall by bolts.

7. A storage bin as defined in claim 1 in which a plurality of upstanding walls are mounted within said outer housing to provide a plurality of storage compartments.

References Cited by the Examiner

UNITED STATES PATENTS

| 873,959 | 12/07 | Roberts | 98—55 |
|---|---|---|---|
| 2,211,395 | 8/40 | Waterman | 98—52 X |
| 2,782,705 | 2/57 | Breidert | 98—55 |

FOREIGN PATENTS 96,884  2/24  Austria.

ROBERT A. O'LEARY, *Primary Examiner.*

RAPHAEL M. LUPO, *Examiner.*